(No Model.)
A. D. & H. E. GOODELL.
BREAST DRILL.
No. 557,328. Patented Mar. 31, 1896.
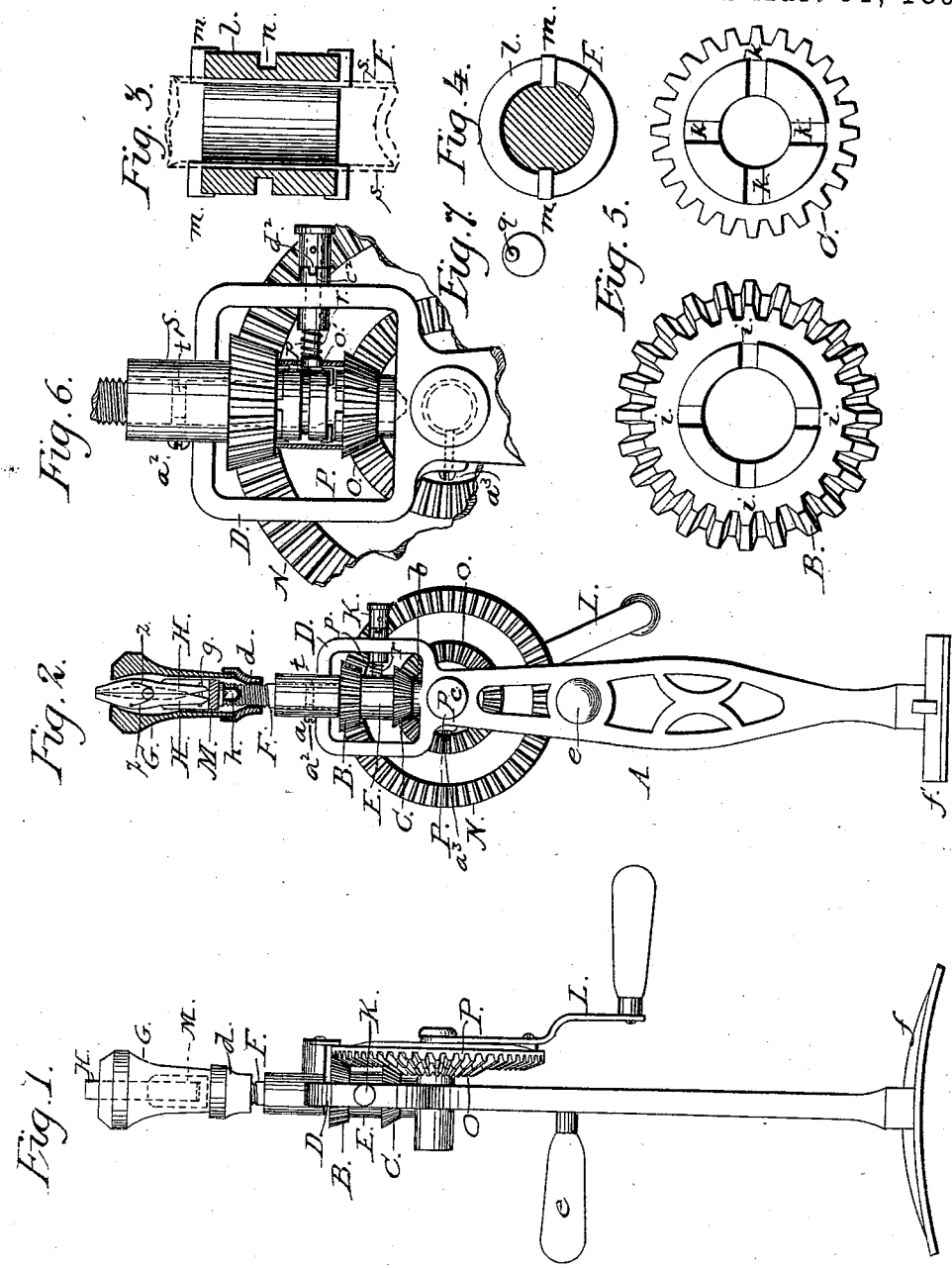
Witnesses:
William G. Walling
Thomas Brown
Inventors:
A. D. Goodell & H. E. Goodell
per Edw. W. Donn
Attorneys.
ANDREW B.GRAHAM, PHOTO-LITHO. WASHINGTON, D.C.

UNITED STATES PATENT OFFICE.

ALBERT D. GOODELL AND HENRY E. GOODELL, OF GREENFIELD, MASSACHUSETTS.

BREAST-DRILL.

SPECIFICATION forming part of Letters Patent No. 557,328, dated March 31, 1896.

Application filed July 23, 1895. Serial No. 556,923. (No model.)

*To all whom it may concern:*

Be it known that we, ALBERT D. GOODELL and HENRY E. GOODELL, citizens of the United States, residing at Greenfield, in the county of Franklin and State of Massachusetts, have invented certain new and useful Improvements in Breast-Drills; and we do hereby declare the following to be a full, clear, and exact description of the invention, such as will enable others skilled in the art to which it appertains to make and use the same.

Our present invention is an improvement in breast-drills, and it has for its object to provide a drill the base of which shall, while it is being operated, rest against the breast of the operator and be there steadied or held firmly by a handle secured to the frame and while the drill is being operated through the medium of a crank and gear-wheels by a rapid or comparatively slow rotary movement.

It consists in the main of a metallic frame, an adjustable breast-piece on one end of said frame, a chuck for a bit on the opposite end of same and between said extremes, a system of gear-wheels shiftable by means of a clutch to increase or reduce the motion of the drill with reference to the motion of the driving-crank and certain circular racks which engage the said gear-wheels, all of which will be hereinafter fully described and shown.

In the drawings illustrating our invention, Figure 1 is an elevation showing an edge view of the device complete. Fig. 2 is an elevation showing a side view of the device complete, the chuck shell being broken away to show jaws, &c. Figs. 3, 4, and 5 are details of the clutch which changes the movement of the wheels with reference to the circular racks to speed or slow the movement of the drill. Figs. 6 and 7 are details showing the relation of the clutch to the thumb-piece and parts connected with it.

Referring to the drawings, A is the frame of the breast-drill having journal-bearings $a\, b\, c$ for the journals of the gear-wheels B C P.

Within a yoke D the wheels B and C are fitted about a shaft F which extends from the chuck of the drill through the said wheels and below the said gear-wheel C, where it rests in a conical bearing of the frame A. The shaft F is screw-threaded within the chuck end externally, and it is hollow to a depth of about half an inch. This shaft has also long grooves $s$ which have relation to the clutch to be described and an annular groove $t$. Between the gear-wheels B C is a body $l$ of cylindrical form provided with an annular groove $n$ and splines $m$. A cylinder E incloses the cylindrical body $l$, extends between gear-wheels B and C, and has an opening $o$ in its side. The cylindrical body $l$ with its splines $m$ is movable axially over the shaft F, and serves as a clutch between the wheels B C. A thumb-piece K with milled head secures a spindle $p$, which latter passes through one arm of the yoke D. On the free end of the spindle $p$ is a die with a pin eccentrically placed thereon extending into the opening $v$ of the separating-cylinder E and entering the annular groove $n$ of cylindrical body $l$, normally there resting, being so held by a spring $r$ which bears between the yoke and an offset at the free end of the spindle $p$. A notch $c^2$ in the frame A and a tongue $d^2$ in the thumb-piece serve as a lock for the cam or pin. The thumb-piece K has on its head the letters "F" and "S," standing for "fast" and "slow," so that when said thumb-piece is turned so that "F" is nearest the chuck the clutch by its splines enters the grooves of the wheel B for fast movement of the chuck. When "S" is brought nearest to the chuck the splines of the clutch enter the grooves of the wheel C to effect a slower movement to the chuck. The splines of cylinder $l$ of the clutch are constantly in engagement with the longitudinal grooves S S of shaft F, so that the movement of either the pinions B or C will give movement to the said shaft.

The chuck of the breast-drill has a shell or housing composed of two parts G and $d$, the said two parts fitting together with a screw-threaded joint. The jaws H of the chuck are in two equal parts held together at their inner ends by a pin $g$ and near their upper ends by two opposite springs $z$, the latter of which tend to separate the two said parts at the mouth of the shell G. The two parts of the jaws of the chuck are grooved within longitudinally and provided at their ends with a V-notch. A slotted sleeve M, having a flat base and a conical seat for the inner end of the jaws, fits over said jaws and keeps the two parts from twisting with reference to each other laterally, forming at the same time an abutment for said jaws. A stud $h$ with a disk-shaped head and a conical end rests normally within the shell G. The portion $d$ of shell G, which is screw-threaded at its narrow end within, fits over the screw-threaded end of the shaft F, so that when said part $d$ is driven down on the said shaft F the said stud $h$ is moved within the larger part of the shell G to carry the slotted sleeve and jaws outward. The shell of the chuck at its end having the usual conical form causes the parts of the jaws to come together that take hold of the bit.

The breast-piece $f$ of the drill is secured to one end of the frame A by a screw, so that it may be moved about the axis of the said frame, thus rendering said piece adjustable as a bearing upon any part of the body. The wheel P, of which the racks N and O are parts, has secured to it at two points a crank L. When the screw which secures the crank at one of the points is removed, said crank may be readily unshipped, since the other point of security is a simple tongue-and-groove arrangement.

$e$ is a handle screwed to the frame A, useful for steadying the frame of the breast-drill and keeping it in true axial line while at work.

Having thus described our invention, what we claim as new, and desire to secure by Letters Patent, is—

1. The clutch composed of a cylinder having an annular groove, opposite splines fixed to said cylinder, extending axially and projecting within and outward at opposite ends, in combination with an operating-shaft having opposite grooves engageable by said splines and means substantially as described for operating said cylinder axially so that said splines may engage opposite gear mechanism as set forth.

2. In a chuck, the combination with the jaws described, the slotted sleeve non-integral with the shell or casing embracing said jaws and the screw-threaded shaft F provided with a cavity in its end and the stud fitting therein and bearing against the end of the slotted sleeve, of the shell composed of parts G and $d$, all arranged as and for the purpose set forth.

3. The combination with the shaft F having opposite longitudinal grooves to receive the splines of the clutch and an annular groove $t$, the clutch and the frame A, of the two gear-wheels, separated by a cylinder E, wheel P, carrying circular racks which mesh with contiguous bevel-gears, and crank L, as set forth.

4. The combination with the shaft of the drill provided with opposite longitudinal grooves, and an annular groove, the frame A, the screws $a^2$ $a^3$, the gear-wheels B and C, provided with grooves at right angles on their inner faces, the clutch-cylinder having a groove the splines of the clutch-cylinder, an eccentric for operating or shifting the clutch-cylinder composed of a spindle with a pin, a spring arranged as described, to keep the pin in position with reference to the clutch-cylinder and the thumb-piece provided with a tongue adapted to engage a groove in the frame A as and for the purpose specified.

In testimony whereof we affix our signatures in presence of two witnesses.

ALBERT D. GOODELL.
HENRY E. GOODELL.

Witnesses:
CLIFTON L. McKNIGHT,
LUCIAN H. SWEETSER.